(12) United States Patent
Trout

(10) Patent No.: US 9,784,306 B1
(45) Date of Patent: Oct. 10, 2017

(54) CONNECTOR ASSEMBLIES

(71) Applicant: William G. Trout, Chandler, AZ (US)

(72) Inventor: William G. Trout, Chandler, AZ (US)

( * ) Notice: Subject to any disclaimer, the term of this patent is extended or adjusted under 35 U.S.C. 154(b) by 0 days.

(21) Appl. No.: 15/481,342

(22) Filed: Apr. 6, 2017

Related U.S. Application Data

(62) Division of application No. 14/841,430, filed on Aug. 31, 2015, now Pat. No. 9,657,771.

(51) Int. Cl.
    *F16G 11/12*     (2006.01)
    *F16C 11/12*     (2006.01)

(52) U.S. Cl.
    CPC ........... *F16C 11/12* (2013.01); *Y10T 403/299* (2015.01); *Y10T 403/32549* (2015.01)

(58) Field of Classification Search
    CPC ............... Y10T 403/29; Y10T 403/299; Y10T 403/32549; Y10T 403/32991; F16C 11/12; E05D 13/12; E05D 13/123
    USPC ........... 403/43, 48, 112, 166; 267/69, 70, 72
    See application file for complete search history.

(56) References Cited

U.S. PATENT DOCUMENTS

| | | | | |
|---|---|---|---|---|
| 1,006,950 A | * | 10/1911 | Keddy | F16F 1/128 267/71 |
| 2,393,836 A | * | 1/1946 | Sutcliffe, Jr. | A01D 59/00 267/74 |
| 2,474,959 A | * | 7/1949 | Rieves | F16C 11/0619 280/93.511 |
| 2,657,372 A | * | 10/1953 | Mowers | H01R 11/15 411/324 |
| 2,772,085 A | * | 11/1956 | Dodge | B66C 13/04 267/128 |
| 3,031,793 A | * | 5/1962 | Waterman | A01M 23/30 43/81 |
| 3,310,012 A | * | 3/1967 | Angelo | D05B 3/16 112/114 |
| 3,478,303 A | * | 11/1969 | Dauser | H01R 4/48 439/435 |
| 3,803,926 A | * | 4/1974 | Winter | F16H 25/20 403/43 |
| 4,018,098 A | * | 4/1977 | Beier | F02M 26/63 403/109.3 |
| 5,156,482 A | * | 10/1992 | Owings | B63H 9/10 403/315 |
| 5,713,686 A | * | 2/1998 | Maughan | F16B 7/06 403/274 |

(Continued)

*Primary Examiner* — Michael P Ferguson
*Assistant Examiner* — Nahid Amiri
(74) *Attorney, Agent, or Firm* — Michael W. Goltry; Robert A. Parsons; Parsons & Goltry

(57) ABSTRACT

A connector assembly includes a shank having an inner abutment proximate to an inner extremity, and an outer abutment proximate to an outer extremity. A connector includes an inner loop that encircles the shank between the inner abutment and the outer abutment and that is movable reciprocally along the shank, a first portion that extends outwardly from the inner loop to a second portion that extends from the first portion past the outer extremity and the abutment to a third portion that extends inwardly and forwardly from the second portion to a pivotally mountable outer loop. Tensioned compression springs encircle the shank between the inner abutment and the inner loop, and act between the inner abutment and the inner loop urging the inner loop toward the outer abutment.

3 Claims, 11 Drawing Sheets

(56) References Cited

U.S. PATENT DOCUMENTS

| | | | | |
|---|---|---|---|---|
| 5,971,669 A * | 10/1999 | Crigler | ............... | E02D 29/0225 |
| | | | | 403/43 |
| 6,059,251 A * | 5/2000 | Gutelius, Jr. | .......... | A47B 91/08 |
| | | | | 248/499 |
| 6,863,461 B2 * | 3/2005 | Werner | ................ | E02F 3/7618 |
| | | | | 403/43 |
| 2014/0190382 A1 * | 7/2014 | Anderson | .............. | A01C 5/066 |
| | | | | 111/193 |

* cited by examiner

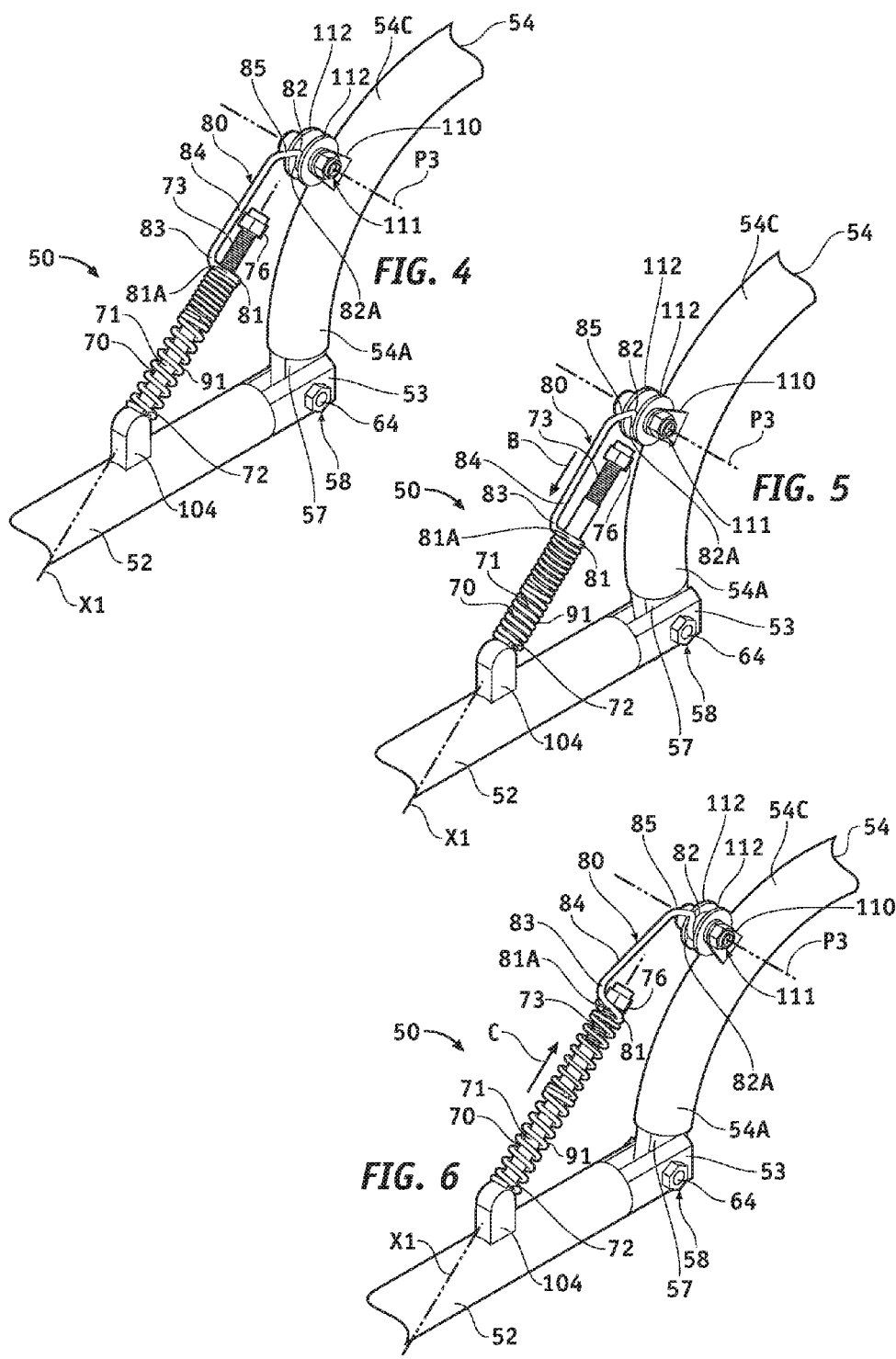

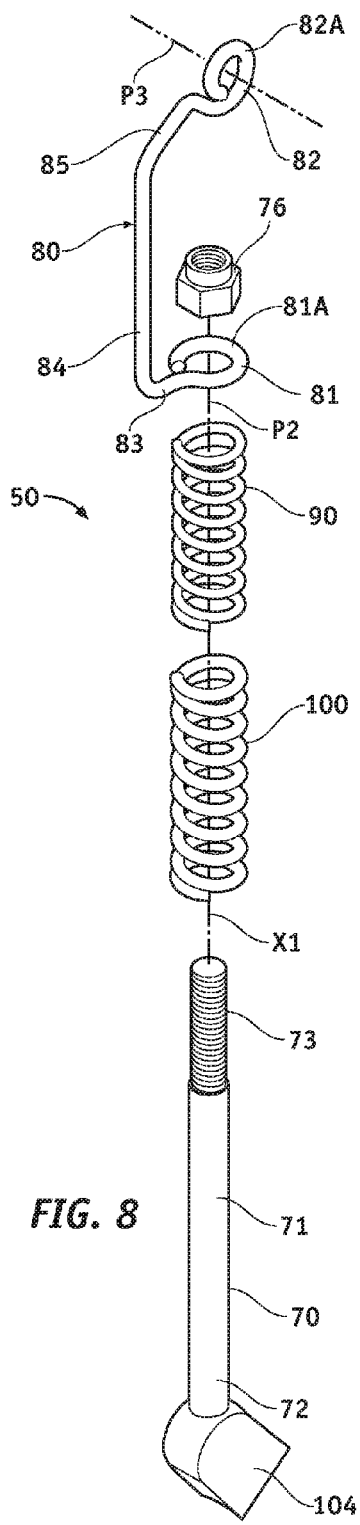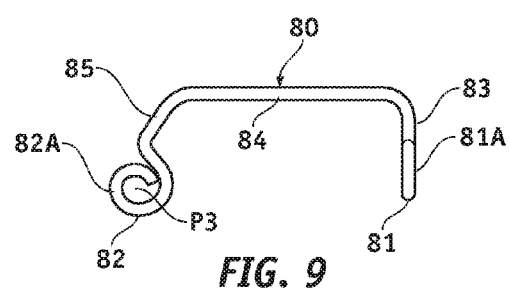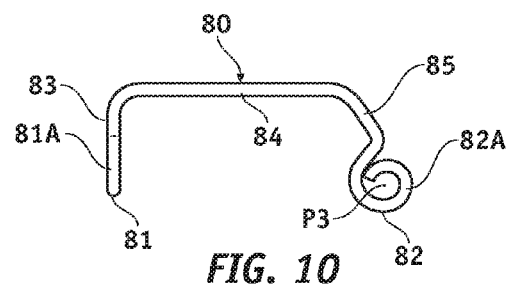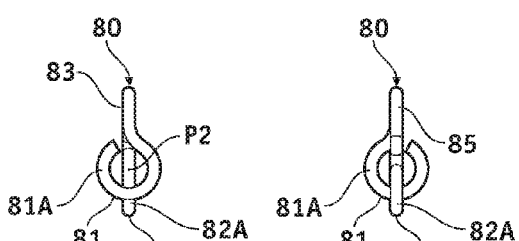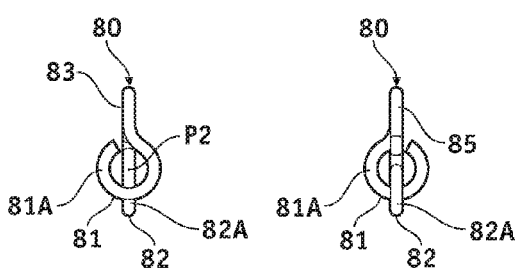

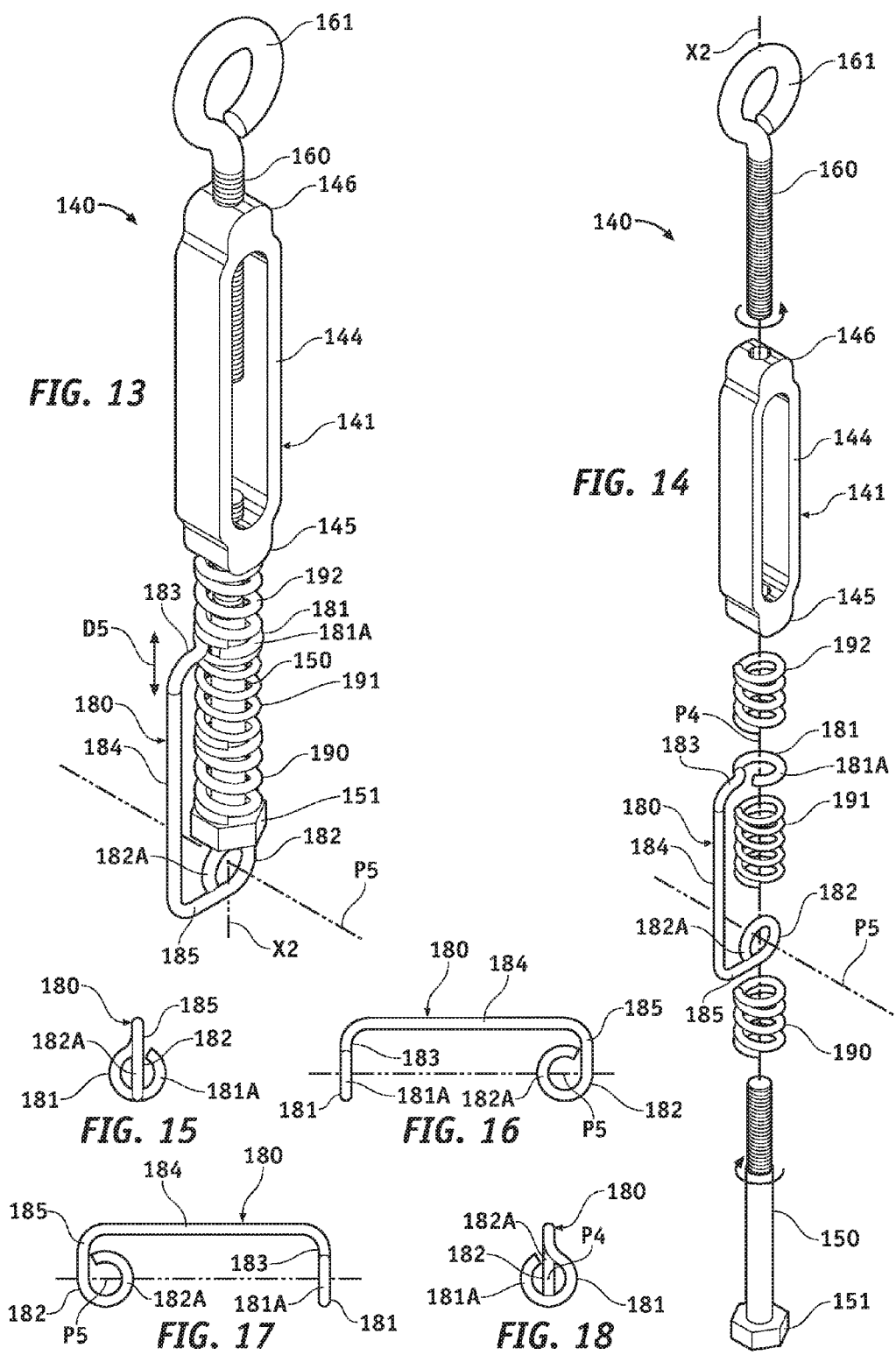

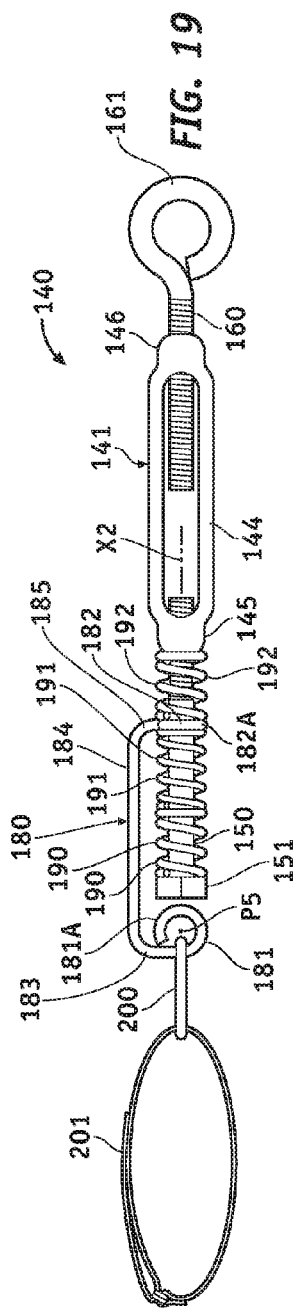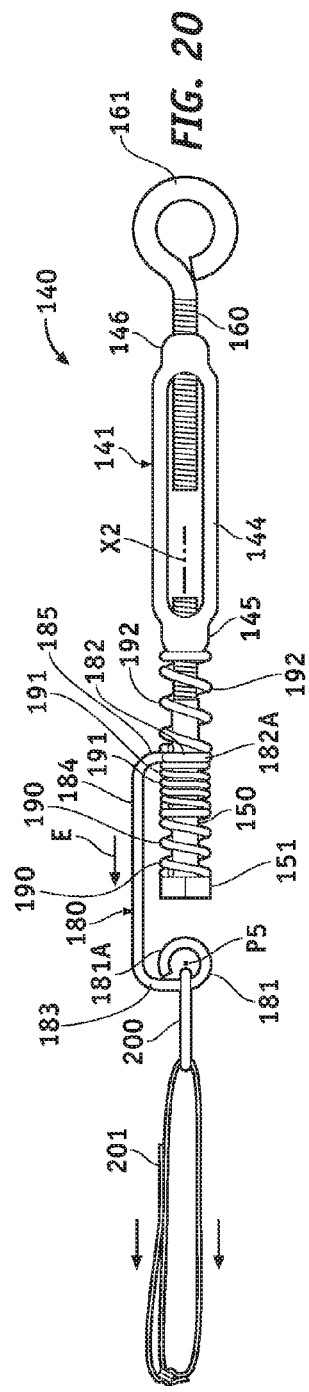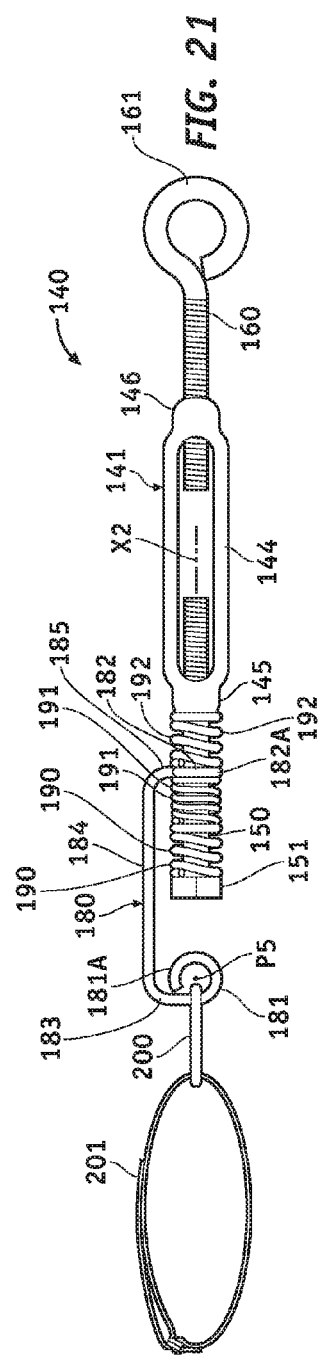

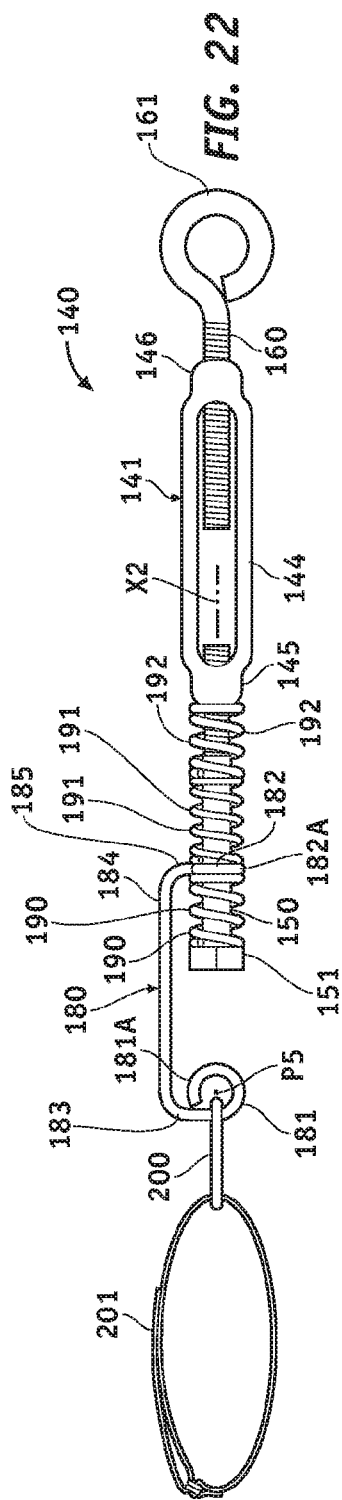
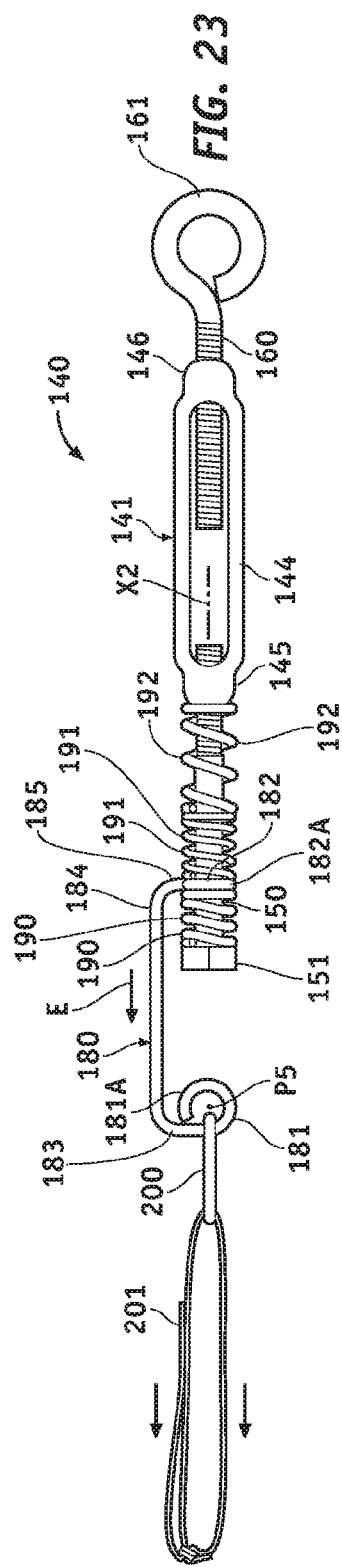

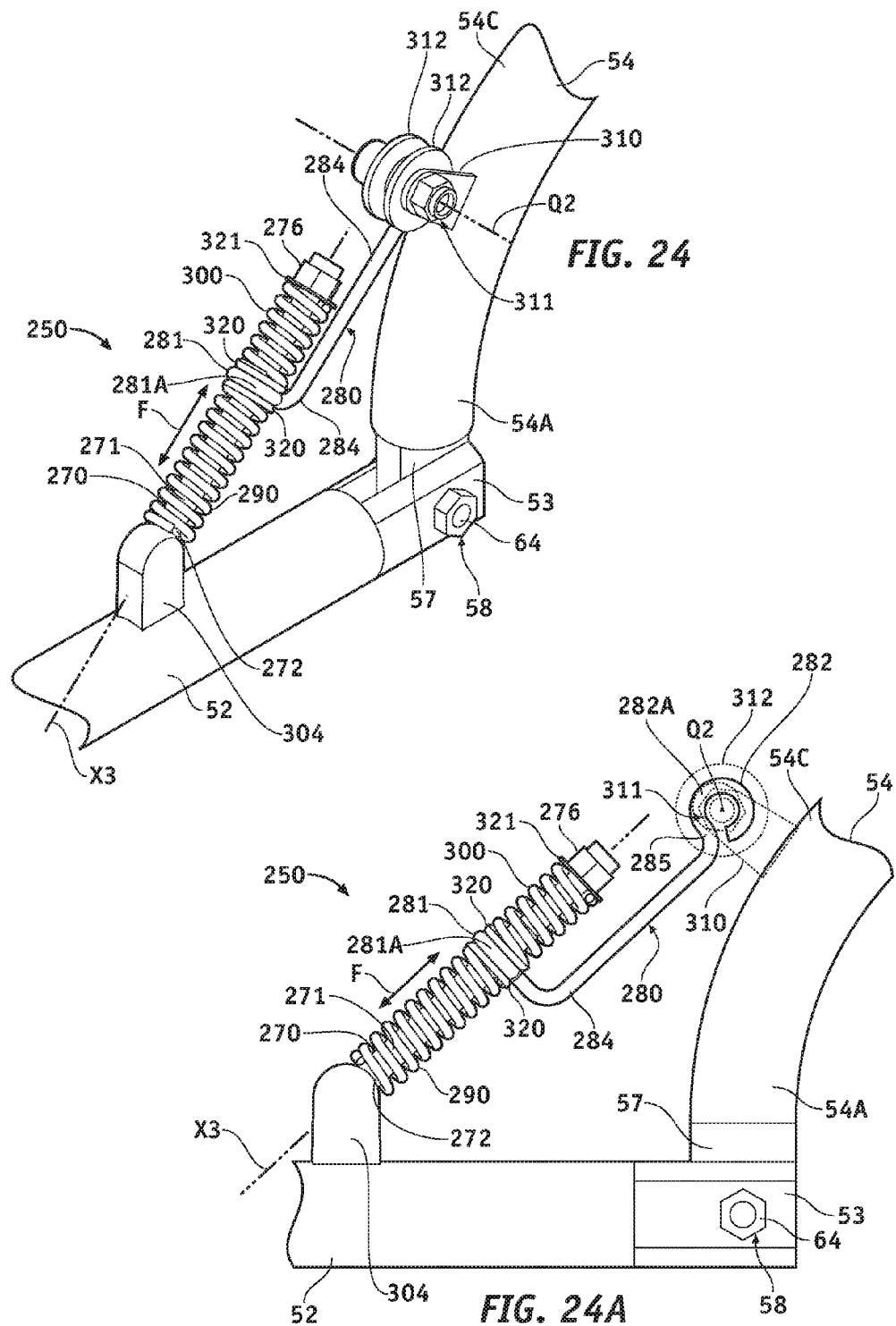

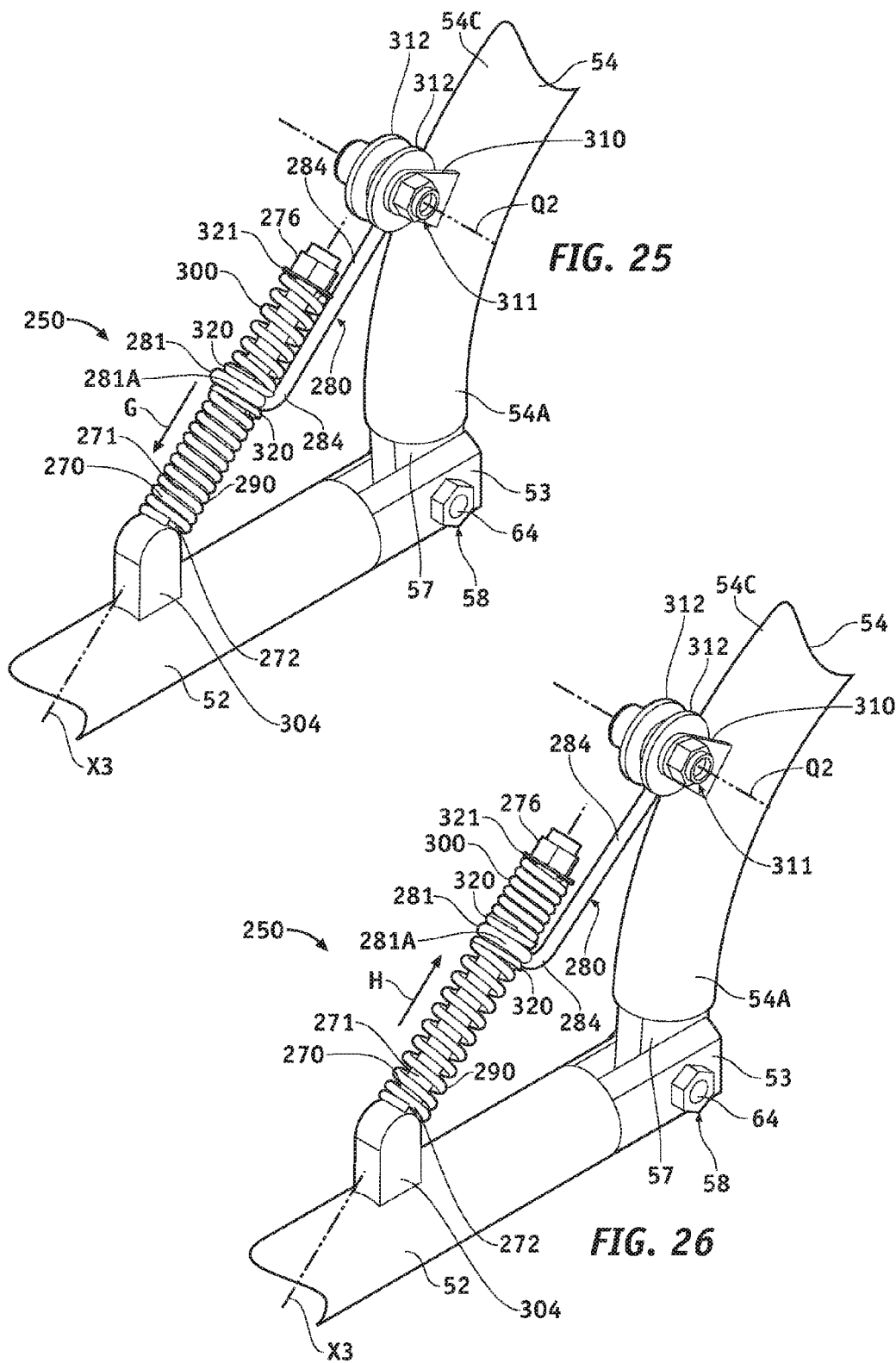

CONNECTOR ASSEMBLIES

CROSS-REFERENCE TO RELATED APPLICATIONS

This application is a divisional of parent application Ser. No. 13/841,430, filed on 31 Aug. 2015, now U.S. Pat. No. 9,657,771 granted on May 23, 2017, which is hereby incorporated by reference in its entirety.

FIELD OF THE INVENTION

The present invention relates to connector assemblies and, more particularly, to connector assemblies for compliantly and resiliently connecting displaceable elements, such as pivotally connected links of linkage assemblies, and tensioning systems.

BACKGROUND OF THE INVENTION

The prior art is replete with connector assemblies for and connectors for interconnecting fixed and moving parts. Although skilled artisans have devoted considerable effort toward such connector assemblies, past efforts have yielded connector assemblies that are complicated in structure, difficult and expensive to construct and, in some cases, impracticable. Accordingly, it is a purpose of the present invention to provide improved connector assemblies useful in dynamically connecting displaceable members and tensioning systems that are simple and efficient and that are adjustable and flexible for numerous applications.

SUMMARY OF THE INVENTION

According to the principle of the invention, a connector assembly includes a shank having an inner extremity, an outer extremity, an inner abutment proximate to the inner extremity, and an outer abutment proximate to the outer extremity. The shank is arranged about a longitudinal axis that extends from the inner extremity to the outer extremity. A connector includes an inner end, a pivotally mountable outer end, and a first portion, a second portion, and a third portion between the inner end and the pivotally mountable outer end. The inner end is an inner loop. The inner loop encircles the shank between the inner abutment and the outer abutment. The inner loop is movable reciprocally along the shank relative to the inner abutment and the outer abutment. The first portion extends laterally outward from the shank from the inner loop to the second portion. The first portion is transverse relative to the longitudinal axis of the shank and is perpendicular relative to the second portion. The second portion extends alongside the shank from the first portion past the outer extremity and the outer abutment to the third portion ahead of the outer extremity and the outer abutment. The third portion extends inwardly from the second portion toward the longitudinal axis of the shank and forwardly from the second portion to the pivotally mountable outer end. The third portion is aslant relative to the second portion and the longitudinal axis of the shank. The second portion of the connector is longer than each of the first portion and the third portion of the connector. The pivotally mountable outer end of the connector is an outer loop. The inner loop encircles an inner loop axis and the outer loop encircles an outer loop axis. The outer loop axis is perpendicular relative to the outer loop axis. First and second compression springs encircle the shank between the inner loop of the connector and the inner abutment. The first and second compression springs and the inner loop are captured on the shank between the inner abutment and the outer abutment. The first compression spring has a first strength. The second compression spring has a second strength. The first strength of the first compression spring is less than the second strength of the second compression spring. The first compression spring is captured between and is tensioned against the inner loop and the second compression spring, the second compression spring is captured between and is tensioned against the first compression spring and the inner abutment. The first and second compression springs keep tension on the inner loop urging the inner loop toward the outer abutment. In a particular embodiment there are first and second displaceable members. The inner abutment is affixed rigidly to the first displaceable member, and the pivotally mountable outer end of the connector is mounted pivotally to the second displaceable member.

According to the principle of the invention, a connector assembly includes a turnbuckle, a connector, a first compression spring, a second compression spring, and a third compression spring. The turnbuckle includes a frame having a first end and a second end, a first bolt screwed into the first end of the frame, and a second bolt screwed into the second end of the frame. The first bolt is arranged about a longitudinal axis and extends outwardly from the first end of the frame to a head, and the second bolt is an eye bolt that extends outwardly from the second end of the frame to a connecting loop. The connector includes an inner end, an outer end, and a first portion, a second portion, and a third portion between the inner end and the outer end. The inner end is an inner loop. The inner loop encircles the first bolt between the first end of the frame and the head. The inner loop is movable reciprocally along the first bolt relative to the first end of the frame and the head. The first portion extends from the inner loop to the second portion. The first portion extends outward from the longitudinal axis of the first bolt and is transverse relative to the second portion. The second portion extends from the first portion past the head of the first bolt to the third portion ahead of the head of the first bolt. The third portion extends inward from the second portion toward the longitudinal axis of the first bolt to the outer end of the connector. The second portion of the connector is longer than each of the first portion and the third portion of the connector, and the outer end of the connector is an outer loop. First, second, and third compression springs encircle the first bolt. The first, second, and third compression springs and the inner loop are captured on the first bolt between the head and the first end of the frame. The second compression spring is tensioned between the first compression spring and the third compression spring. The first compression spring is tensioned between the head and the second compression spring. The third compression spring is tensioned between the second compression spring and the first end of the frame. The inner loop encircles the first bolt between the second compression spring and one of the first compression spring and the third compression spring. The first, second, and third compression springs are tensioned in series from the head of the first bolt to the first end of the frame. The first compression spring is tensioned against the head, the third compression spring is tensioned against the first end of the frame, the second compression spring and the one of the first compression spring and the third compression spring are tensioned against the inner loop, and the second compression spring and the other one of the first compression spring and the third compression spring are tensioned against one another. The first compression spring has a first strength, the second compression spring has a second strength, and the third compression spring has a third strength. The second strength of the second compression spring is less than each of the first strength of the first compression spring and the third strength of the third compression spring. The first portion of the connector is perpendicular relative to the second portion of the connector and the longitudinal axis of the first bolt. The third portion of the connector is perpendicular relative to the second portion of the connector and the longitudinal axis of the first bolt.

According to the principle of the invention, a connector assembly includes a shank having an inner extremity, an outer extremity, an inner abutment proximate to the inner extremity, and an outer abutment proximate to the outer extremity. The shank is arranged about a longitudinal axis that extends from the inner extremity to the outer extremity. A connector includes an inner end, a pivotally mountable outer end, and a first portion, a second portion, and a third portion between the inner end and the pivotally mountable outer end. The inner end is an inner loop. The inner loop encircles the shank between the inner abutment and the outer abutment. The inner loop is movable reciprocally along the shank relative to the inner abutment and the outer abutment. The first portion extends laterally outward from the shank from the inner loop to the second portion. The first portion is transverse relative to the longitudinal axis of the shank and is perpendicular relative to the second portion. The second portion extends alongside the shank from the first portion past the outer extremity and the outer abutment to the third portion ahead of the outer extremity and the outer abutment. The third portion extends inwardly from the second portion toward the longitudinal axis of the shank and forwardly from the second portion to the pivotally mountable outer end. The third portion is aslant relative to the second portion and the longitudinal axis of the shank. The second portion of the connector is longer than each of the first portion and the third portion of the connector. The pivotally mountable outer end of the connector is an outer loop. The inner loop encircles an inner loop axis and the outer loop encircles an outer loop axis, and the outer loop axis is perpendicular relative to the outer loop axis. First and second compression springs encircle the shank between the inner abutment and the outer abutment. The first and second compression springs and the inner loop are captured on the shank between the inner abutment and the outer abutment. The inner loop encircles the shank between the first compression spring and the second compression spring. The first compression spring is tensioned against the inner abutment and the inner loop. The second compression spring is tensioned against the inner loop and the outer abutment. The first and second compression springs keep tension on either side of the inner loop. In a particular embodiment there are first and second displaceable members, the inner abutment is affixed rigidly to the first displaceable member, and the pivotally mountable outer end of the connector is mounted pivotally to the second displaceable member.

Consistent with the foregoing summary of illustrative embodiments, and the ensuing detailed description, which are to be taken together, the invention also contemplates associated apparatus and method embodiments.

BRIEF DESCRIPTION OF THE DRAWINGS

Referring to the drawings:

FIG. 4 is a fragmentary perspective view of the displaceable members corresponding to FIG. 1 showing the connector assembly set to the initial sag;

FIG. 5 is a fragmentary perspective view of the displaceable members corresponding to FIG. 2 showing the connector assembly set to the loaded sag;

FIG. 6 is a fragmentary perspective view of the displaceable members corresponding to FIG. 3 showing the connector assembly set to the unloaded sag;

FIG. 8 is an exploded perspective view of the connector assembly of FIG. 1;

FIG. 9 is a right side elevation view of a connector of the connector assembly of FIG. 8;

FIG. 10 is a left side elevation view of the embodiment of FIG. 9;

FIG. 11 is a front elevation view of the embodiment of FIG. 9;

FIG. 12 is a rear elevation view of the embodiment of FIG. 9;

FIG. 13 is a perspective view of an alternate embodiment of a connector assembly;

FIG. 14 is an exploded perspective view of the connector assembly of FIG. 13;

FIG. 15 is a right side elevation view of a connector of the connector assembly of FIG. 13;

FIG. 16 is a left side elevation view of the embodiment of FIG. 15;

FIG. 17 is a front elevation view of the embodiment of FIG. 13;

FIG. 18 is a rear elevation view of the embodiment of FIG. 13;

FIGS. 19-23 are side elevation views illustrating various operating positions of the connector assembly of FIG. 13;

FIG. 24 is a fragmented perspective view of the displaceable members corresponding to FIG. 4 connected to a further embodiment of a connector assembly shown set to an initial sag corresponding to an initial position of the outer arm relative to the inner arm;

FIG. 24A is a side elevation view of the embodiment of FIG. 24, portions of the view being shown in phantom like to better illustrate the components thereof;

FIG. 25 is a view similar to that of FIG. 24 illustrating the outer arm pivoted to an inner position relative to the inner arm, and the connector assembly set to an inner loaded sag corresponding to the inner position of the outer arm relative to the inner arm;

FIG. 26 is a view similar to that of FIG. 24 illustrating the outer arm pivoted to an outer position relative to the inner arm, and the connector assembly set to an outer loaded sag corresponding to the outer position of the outer arm relative to the inner arm;

DETAILED DESCRIPTION

Figure 1:
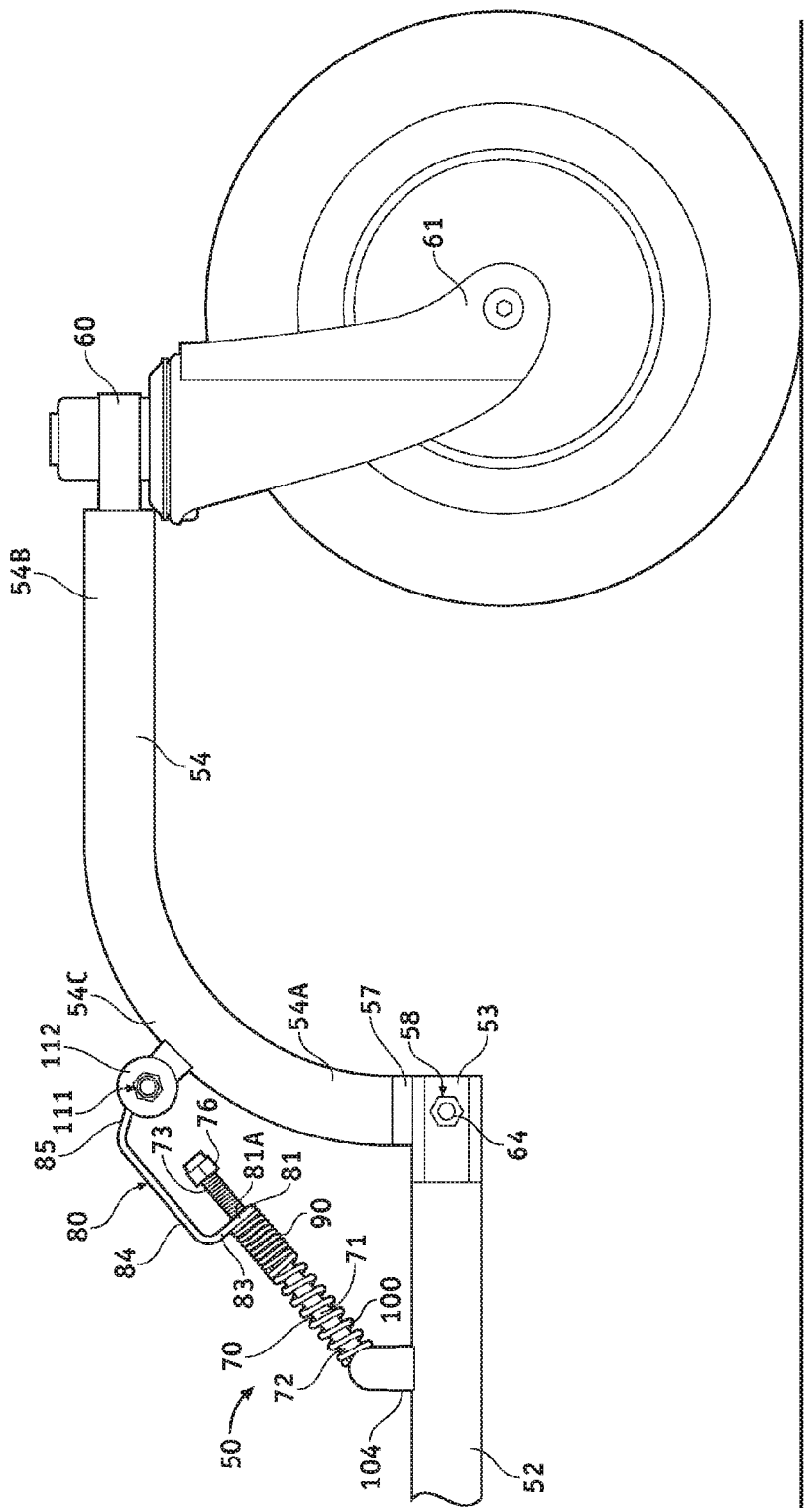
FIG. 1 is a side elevation view of a connector assembly connected to displaceable members including a segment of an inner arm pivotally connected to an outer arm having an outer end formed with an attached stabilizer for interacting with the ground, the connector assembly shown set to an initial sag corresponding to an initial position of the outer arm relative to the inner arm.

Turning now to the drawings, in which like reference characters indicate corresponding elements throughout the several views, attention is first directed to FIG. 1 in which there is seen a side elevation view of a connector assembly 50 shown connected to displaceable members, including a segment of an inner arm 52 pivotally connected to an outer arm 54 having an outer end 60 formed with an attached stabilizer 61 for interacting with the ground. Inner arm 52 is for being connected to a vehicle that is driven over the ground, such as a bicycle or other pedal-driven vehicle, a trolley, a wagon, or the like, and stabilizer 61 is for interacting with the ground over which such as vehicle is driven like a training wheel assembly to stabilize the vehicle as it is driven to, for instance, prevent it from tipping over or otherwise becoming unstable. In this example, stabilizer 61 is a wheel that is capable of rolling over the ground over which the vehicle connected to inner arm 52 is driven. In an alternate embodiment, stabilizer 61 can be a skid for running over the ground.

Figure 2:
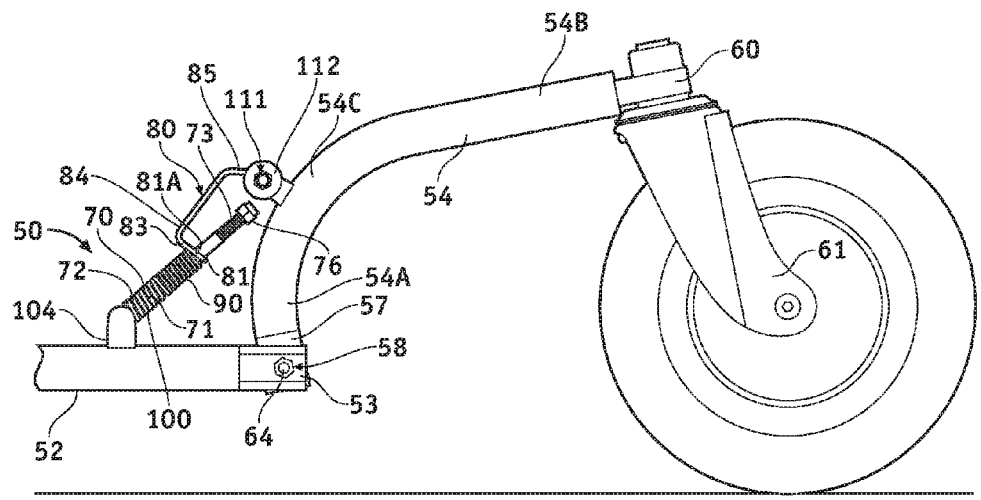
FIG. 2 is a view similar to that of FIG. 1 illustrating the outer arm pivoted to a loaded position relative to the inner arm, and the connector assembly set to a loaded sag corresponding to the loaded position of the outer arm relative to the inner arm.
Figure 3:
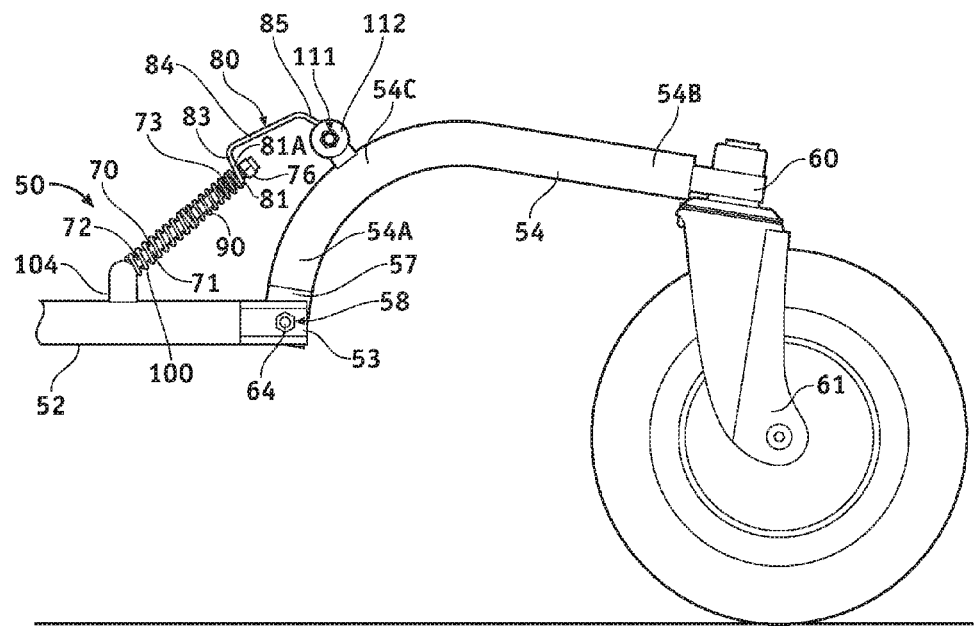
FIG. 3 is a view similar to that of FIG. 1 illustrating the outer arm pivoted to an unloaded position relative to the inner arm, and the connector assembly set to an unloaded sag corresponding to the unloaded position of the outer arm relative to the inner arm.

Inner arm 52 includes an outer end 53. Outer arm 54 includes a first part 54A having inner end 57, and a second part 54B having outer end 60 connected to stabilizer 61, and an intermediate bend 54C between first part 54A and second part 54B. A conventional pivot joint 64 pivotally connects outer end 53 of inner arm 52 to inner end 57 of first part 54A of outer arm 54. First part 54A extends upright from inner end 57 to intermediate bend 54C in outer arm 54, and the second part 54B extends forward or outward from the intermediate bend 54C in the outer arm 54 to stabilizer 61, which depends downwardly from outer end 60 of outer arm 54 ahead of and opposing pivot joint 64. In this example, inner end 57 of outer arm 54 is an eye bar and outer end 53 of inner arm 52 is a clevis. The eye bar of outer end 53 of inner arm 52 is inserted into the clevis of inner end 57 of outer arm 54, which are attached pivotally with a nut-and-bolt assembly 58. This characterizes pivot joint 64, which provides pivotal movement of outer arm 54 relative to inner arm 52 from an inner or loaded position toward inner arm 52 in FIG. 2 to an outer or unloaded position away inner arm 52 in FIG. 3 from either side of an initial, starting, or neutral position of outer arm 54 in FIG. 1 between the inner position of outer arm 54 in FIG. 2 and the outer position of outer arm 54 in FIG. 3. Connector assembly 50 is connected to inner arm 52 and the intermediate bend 54C of outer arm 54. Connector assembly 50 extends across the inner angle between inner arm 52 and first part 54A to the intermediate bend 54C of outer arm 54. Connector assembly 50 is mounted rigidly and immovably to inner arm 52 and is mounted pivotally to intermediate bend 54C in outer arm 54. Connector assembly 50 acts as a shock absorber between inner arm 52 and outer arm 54, displacing between shortened and lengthened conditions in response to pivotal movement of outer arm 54 relative to inner arm 52 between its inner/loaded position and its outer/unloaded position. Connector assembly 50 is set to an initial or starting sag corresponding to the initial, neutral, or starting position of outer arm 54 relative to inner arm 52 in FIG. 1, is set to or otherwise assumes a loaded sag corresponding to the inner or loaded position of outer arm 54 relative to inner arm 52 in FIG. 2, and is set to or otherwise assumes an unloaded sag corresponding to the outer or unloaded position of outer arm 54 relative to inner arm 52 in FIG. 3. The term "sag" is a common term in the field of shock absorbers and means the amount of sag or deflection of the shock absorber, here being connector assembly 50. FIG. 4 is a fragmentary perspective view of the displaceable members corresponding to FIG. 1 showing connector assembly 50 set to its initial sag corresponding to the initial, starting, or neutral position of outer arm 54 relative to inner arm 52 under a normal load condition, FIG. 5 is a fragmentary perspective view of the displaceable members corresponding to FIG. 2 showing connector assembly set 50 to its loaded sag corresponding to the inner or loaded position of outer arm 54 relative to inner arm 52 under a loaded condition that is greater than the normal load condition, and FIG. 6 is a fragmentary perspective view of the displaceable members corresponding to FIG. 3 showing connector assembly 50 set to its unloaded sag corresponding to the outer or unloaded position of outer arm 54 relative to inner arm 52 under an unloaded condition that is less than the normal load condition.

Figure 7:
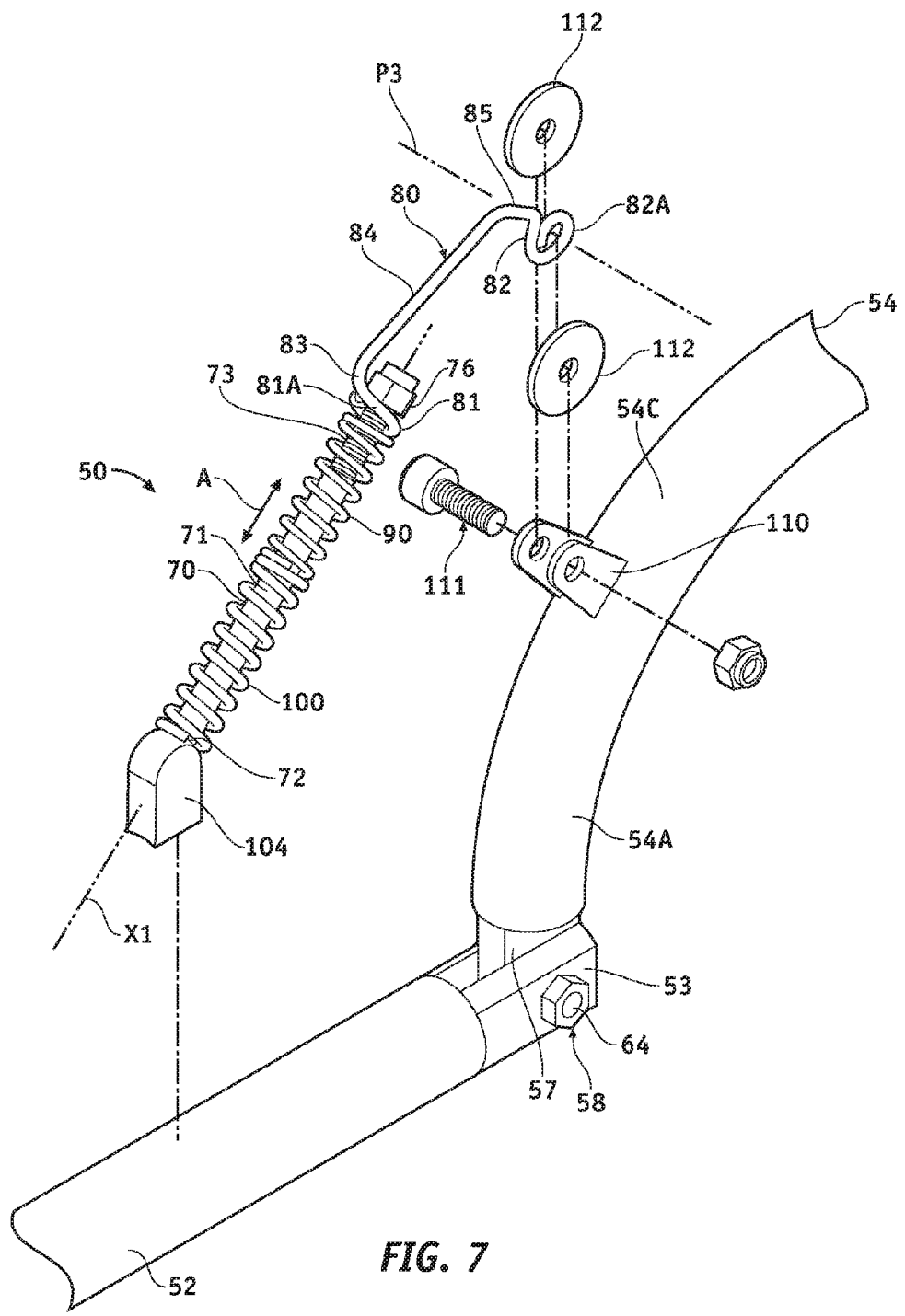
FIG. 7 is a fragmentary perspective view of the displaceable members of FIG. 1 and a partially exploded perspective view of the connector assembly.

Turning to FIGS. 7 and 8, connector assembly 50 includes bolt 70. Bolt 70 is a shank 71 that includes inner extremity 72, and outer extremity 73. Inner extremity 72 is mountable rigidly and is formed with lug 104, which is mounted rigidly and immovably to inner arm 52. Outer extremity 73 is threaded. Nut 76 is threaded onto outer extremity 73. Nut 76 is considered a part of shank 71 when threaded on outer extremity 73. Lug 104 is an inner abutment of shank 71 proximate to inner extremity 72, and nut 76 is an outer abutment applied to shank 71 proximate to outer extremity 73. Accordingly, reference numeral 104 is used to denote both the lug and the inner abutment of shank 71, and reference numeral 76 is used to denote both the bolt and the outer abutment of shank 71. Shank 71 is elongate and straight and is arranged about a longitudinal axis X1 in FIG. 7 that extends from inner extremity 72 to outer extremity 73. In an alternate embodiment, outer abutment 76 can be fixed in place, such as by welding. Longitudinal axis X1 is a fixed axis because lug 104 of inner extremity 72 of bolt 70 is mounted rigidly and immovably to inner arm 52.

Connector assembly 50 further includes a connector 80. Connector 80 is an elongate member formed of spring wire that is bent to shape, and that has shape memory. Referring to FIGS. 8-12 in relevant part, connector 80 includes an inner end 81, an outer end 82, and a first portion 83, a second portion 84, and a third portion 84 between inner end 81 and outer end 82. First, second, and third portions 83, 84, and 85 of connector 80 are each elongate, each having a length. The length of second portion 84 of connector 50 is longer than the length of first portion 83 and also the length of third portion 85. The length of third portion 85 is, in turn, longer than the length of first portion 83. Inner end 81 is an inner loop 81A. Inner loop 81A is not completely closed, but can be completely closed in an alternate embodiment if so desired by rigidly affixing, such as by welding or heat bonding, the tag end of inner loop 81A to the opposed standing part of inner end 81.

First, second, and third portions 83, 84, and 85 reside in a common plane. First and third portions 83 and 85 extend outwardly in same direction from bends at either end of second portion 84. First portion 83 is perpendicular relative to second portion 84, and third portion 85 extends forwardly from second portion and is aslant/oblique relative to second portion 84 at an angle of from 40 degrees to 45 degrees in this example. Outer end 82 is pivotally mountable, and is a pivotally mountable outer loop 82A. In FIG. 12, inner loop 81A encircles an inner loop axis P2. In FIGS. 9 and 10, outer loop 82A encircles outer loop axis P3. Inner loop axis P2 is perpendicular relative to the outer loop axis P3.

In FIG. 7, inner end 81 of connector 80 is mounted reciprocally to shank 71 between inner abutment 104 and outer abutment 76 for movement in reciprocal directions relative to inner abutment 104 and outer abutment 76 indicated by double arrowed line A. Specifically, inner loop encircles shank 71 proximate to outer extremity 73 between lug 104 defining the inner abutment of shank 71, and nut 76 defining the outer abutment of shank 71. First portion 83 extends from inner loop 81A to second portion 84. First portion 83 extends radially outward from shank 71 away from inner arm 52 and from longitudinal axis X1 of shank 71 to second portion 84, and second portion 84 is, as indicated above, perpendicular relative to first portion 83. Second portion 84 is spaced from, and extends along the side of shank 71, and extends forwardly from first portion 83 past outer extremity 73 and outer abutment 76 to third portion 85 ahead of outer extremity 73 and outer abutment 76. Third portion 85 extends inwardly from second portion 84 toward longitudinal axis X1 of shank 71 and forwardly from second portion 84 to outer loop 82A of outer end 82, the third portion being aslant/oblique relative to second portion 84 and also relative to shank 71 including longitudinal axis X1 of shank 71.

Sufficient clearance between inner loop 81A and shank 71 permits inner loop 81A to pivot on shank 71 relative to longitudinal axis X1, and to move in reciprocal directions along shank 71 along longitudinal axis X1 as indicated by double arrowed line A in FIG. 7 relative to inner abutment 104 and outer abutment 76 between an inner position in FIGS. 2 and 5 corresponding to the loaded sag of connector assembly 50 and an inner or retracted position of connector 80 relative to shank 71, an outer position in FIGS. 3 and 6 corresponding to the unloaded sag of connector assembly 50 and an outer or extended position of connector 80 relative to shank 71, and an intermediate position in FIGS. 1 and 4 between the inner position of inner loop 81A in FIG. 2 and the outer position of loop 81A in FIG. 3 corresponding to the initial sag of connector assembly 50 and an initial, starting, or neutral position of connector 80 relative to shank 70.

In FIG. 8, connector assembly 50 further includes a first compression spring 90 and a second compression spring 100. First and second compression springs 90 and 100 are conventional compression/tension springs that each provides an outward bias. Each of the first and second compression springs 90 and 100 is a wire formed into numerous active coils. First and second compression springs 90 and 100 are each fashioned of spring steel having the customary constant moduli of elasticity as is typical with compression/tension springs. In FIG. 7, first and second compression springs 90 and 100 are installed on shank 70 between inner abutment 104 and outer abutment 76. Specifically, first and second compression springs 90 and 100 encircle shank between inner loop 81A of connector 80 and inner abutment 104 of shank 71. First and second compression springs 90 and 100 and inner loop 81A are installed onto shank 71 over outer extremity 73 and then nut 76 is threaded onto outer extremity 73 of shank 71. First compression spring 90 is positioned between inner loop 81A and second compression spring 100, inner loop 81A is positioned between first compression spring 90 and outer abutment 76, and second compression spring 100 is positioned between inner abutment 104 and first compression spring 90. First and second compression springs 90 and 100 and inner loop 81A are captured on shank 71 between inner abutment 104 and outer abutment 76, which is nut 76. First compression spring 90 is captured between and is tensioned against inner loop 81A of connector 80 and second compression spring 100, and second compression spring 100 is captured between and is tensioned against first compression spring 90 and inner abutment 104 of connector 80. First and second compression springs are outwardly tensioned and act against inner abutment 104 and inner loop 81A urging inner loop 81A toward or otherwise in the direction of outer abutment 76.

A compression spring is designed with a specific strength or working stress, which is dependent on the material, the diameter of the wire and the pitch of the coils. In connector assembly 50, first compression spring 90 has a first strength or working stress, second compression spring 100 has a second strength or working stress, and the first strength or working stress of first compression spring 90 is less than the second strength or working stress of second compression spring 100. Compression springs 90 and 100 are well known "average service" springs. Average service springs make up the majority of springs in general use such as those found in motors, brakes, switches, machines, and mechanical products. Depending on the application, compression springs 90 and 100 can be "light service" compression springs, or "severe service" compression springs in alternate embodiments. Light service compression springs are well known to the skilled artisan and have small deflections with low stress ranges. Severe service compressions springs are also well known to the skilled artisan and are subjected to rapid deflections over long periods of time.

Connector assembly 50 is useful for resiliently and dynamically connecting displaceable members, such as pivotally connected inner and outer arms 52 and 54 in FIGS. 1-6. As stated above, connector assembly 50 is connected to inner arm 52 and the intermediate bend 54C of outer arm 54, and extends across the inner angle between inner arm 52 and first part 54A to the intermediate bend 54C of outer arm 54. Referencing FIGS. 1-7 in relevant part, inner extremity of shank 71 is mounted rigidly and immovably to inner arm 52 with lug 104, and outer end 82 of connector 80 is mounted pivotally to the intermediate bend 54C of outer arm 54 between first part 54A and second part 54B. In this example, lug 104 is affixed rigidly and immovably to inner arm 52 via welding. A clevis 110 is rigidly affixed to intermediate bend 54C of outer arm 54 via welding, and outer loop 82A of outer end 82 of connector 80 is pivotally connected to clevis 110 with nut-and-bolt assembly 110. Outer loop 82A pivots at nut-and-bolt assembly 111 about a pivot axis, which is outer loop axis P3. Washers 112 encircle the bolt of nut-and-bolt assembly 111 between clevis 110 on either side of outer loop 82A.

Connector assembly 50 holds inner and outer arms 52 and 54 in operative positions and restrains movement of outer arm 54 relative to inner arm 52 from its inner or loaded position in FIG. 2 and its outer or unloaded position in FIG. 3. Connector assembly 50 acts as a shock absorber between inner arm 52 and outer arm 54. The tension supplied by first and second tension springs 90 and 100 constantly urges inner loop 81A toward outer abutment 76.

In FIGS. 1 and 4, connector assembly 50 is set to the initial or starting sag corresponding to the initial or neutral or starting position of outer arm 54 relative to inner arm 52 in FIGS. 1 and 4 in a normal load condition. In this starting position of outer arm 54 relative to inner arm, stabilizer 61 is set against the ground and inner loop 81A is set to its intermediate position between the inner position of inner loop 81A in FIGS. 2 and 5 and the outer position of loop 81A in FIG. 3 corresponding to the initial position of connector 80, and first and second compression springs 90 and 100 are tensioned to the initial sag of connector assembly 50, in which first compression spring 90 is tensioned/compressed comparatively more than second compression spring 100 because the strength of first compression spring 90 is less than the strength of second compression spring 100.

In response to movement of outer arm 54 from its starting position in FIGS. 1 and 4 to its inner or loaded position in FIGS. 2 and 5, such as in response to stabilizer 61 striking an object or in response to an increased load applied across inner and outer arms 52 and 54, outer end 82 of connector 80 pivots at outer loop 82A about outer loop axis P3, and connector 80 is driven in the direction of arrowed line B in FIG. 5 from its initial position in FIGS. 1 and 4 to its retracted position in FIGS. 2 and 5 concurrently urging inner loop 81A along shank 71 in the same direction away from outer abutment 76 and toward inner abutment 104 from its initial position in FIGS. 1 and 4 to its loaded position in FIGS. 2 and 5 concurrently compressing first and second compression springs 90 and 100 between inner loop 81A and inner abutment 104. Because second compression spring 100 is stronger than first compression spring 90, first and second compression springs 90 and 100 cooperate to increasingly resist movement of outer arm 54 as first and second compression springs 90 and 100 are compressed between inner abutment 104 and inner loop 81A as outer arm 54 moves from its starting position in FIGS. 1 and 2 to its inner or loaded position in FIG. 5.

In response to movement of outer arm 54 from its starting position in FIGS. 1 and 4 or its inner or loaded position in FIGS. 2 and 5 to its outer or unloaded position in FIGS. 3 and 6, outer end 82 of connector 80 pivots at outer loop 82A about outer loop axis P3, and connector 80 is driven in the direction of arrowed line C in FIG. 6 from its initial position in FIGS. 1 and 4 to its extended position in FIGS. 3 and 6 concurrently urging inner loop 81A along shank 71 in the same direction away from inner abutment 104 and toward and against outer abutment 76 concurrently and partially decompressing first and second compression springs 90 and 100 between inner loop 81A and inner abutment 104. Outer abutment 76 limits/restrains the outward movement of inner loop 81A. Because second compression spring 100 is stronger than first compression spring 90, first and second compression springs 90 and 100 cooperate to decreasingly resist movement of outer arm 54 as it moves from its starting position in FIGS. 1 and 4 to its outer or unloaded position in FIGS. 3 and 6. In the outermost position of inner loop 81A against outer abutment 76, first and second compression springs 90 and 100 remain partially tensioned urging inner loop 81A toward and against outer abutment 76. In response to movement of connector 80 from its starting position to its inner position and from its starting position to its outer position, inner loop 81A freely pivots on shank 71 relative to longitudinal axis X1 and moves along shank 71 in reciprocal directions relative to inner abutment 104 and outer abutment 76. Connector assembly 50 provides shock absorption between inner and outer arms 52 and 54, and tends to keep stabilizer 61 in contact with the ground.

As nut 76 is threaded on outer extremity 73 of shank 71 of bolt 70, nut 76 forming the outer abutment is adjustable in reciprocal directions along shank 71 in response to rotation of nut 76 relative to shank 71. This adjustability of nut 76 allows the initial tension of first and second compression springs 90 and 100 to be adjusted as needed.

In FIGS. 1-6, inner loop 81A encircles shank 71, first portion 83 extends from inner loop 81A to second portion 84, first portion 83 extends radially outward from shank 71 and from longitudinal axis X1 of shank 71 and from the inner angle between inner and outer arms 52 and 54 to second portion 84, second portion 84 is perpendicular relative to first portion 83, second portion 84 is spaced from and extends along the side of shank 71 and extends forwardly from first portion 83 past outer extremity 73 and outer abutment 76 to third portion 85 ahead of outer extremity 73 and outer abutment 76, and third portion 85 extends inwardly from second portion 84 toward longitudinal axis X1 of shank 71 and forwardly from second portion 84 to outer loop 82A of outer end 82 pivotally connected to outer arm 54, the third portion 85 being aslant/oblique relative to second portion 84 and shank 71 including longitudinal axis X1 of shank 71, outer loop 82A of outer end 82 located ahead of an opposing outer extremity 74 and outer abutment 76. The shape of connector 80 is chosen to produce a mechanical advantage to compress and decompress springs 90 and 100 with the movement of connector 80 between its inner and outer positions in response to pivotal movement of outer arm 54 between its inner and outer positions. The orientation of third portion 85 being aslant/oblique from second portion 84 to the pivotal connection of outer loop 82A relative to second portion 84 and shank 71 including longitudinal axis X1 of shank 71 imparts strength in connector 80 and produces the mechanical advantage of connector 80.

FIGS. 13, 14, and 19-23 show an alternate embodiment of a connector assembly 140 including a turnbuckle 141. Turnbuckle 141 includes a frame 144. Frame 144 has a first end 145 and a second end 146. First end 145 is in-line with respect to second end 146. A first bolt 150 is threaded/screwed into first end 145 of frame 144. A second bolt 160 is threaded/screwed into second end 146 of frame 144. First bolt 150 is arranged about a longitudinal axis X2 and extends outwardly from first end 145 of frame to a head 151. Second bolt 160 is an eye bolt that extends outwardly from second end 146 of frame 144 to a connecting loop 161. Second bolt 160 is in-line with respect to first bolt 150, and is arranged about longitudinal axis X2.

Connector assembly 140 further includes a connector 180. Referring in relevant part to FIGS. 13-23, connector 180 is an elongate member and is formed of spring wire that is bent to shape, and that has shape memory. Referring to FIGS. 13-18 in relevant part, connector 180 includes an inner end 181, an outer end 182, and a first portion 183, a second portion 184, and a third portion 185 between inner end 181 and outer end 182. First, second, and third portions 183, 184, and 185 of connector 180 are each elongate, each having a length. The length of second portion 184 of connector 180 is longer than the length of first portion 183 and also the length of third portion 185. The length of third portion 185 is, in turn, equal to the length of first portion 183. Inner end 181 is an inner loop 181A. Outer end 182 is an outer loop 182A. In FIG. 18, inner loop 181A encircles an inner loop axis P4. First, second, and third portions 183, 184, and 185 reside in a common plane. First and third portions 183 and 185 extend outwardly from bends at either end of second portion 184. First portion 183 is perpendicular relative to second portion 184, and third portion 185 is perpendicular relative to second portion 184. Outer end 182 is pivotally mountable, and is a pivotally mountable outer loop 182A. In FIGS. 15 and 16, outer loop 182A encircles outer loop axis P5. Inner loop axis P4 is perpendicular relative to the outer loop axis P5.

In FIGS. 13 and 19, inner loop 181A encircles first bolt 150 between first end 145 of frame 144 and head 151 of first bolt 150. Sufficient clearance between inner loop 181A and first bolt 150 permits inner loop 181A to move in reciprocal directions along first bolt 150 along longitudinal axis X2 as indicated by double arrowed line D in FIG. 13 relative to first end 145 of frame 144 and head 151 of first bolt 150 to permit corresponding movement of connector 180 in reciprocal directions indicated by double arrowed line D. First portion 183 of connector 180 extends from inner loop 181A to second portion 184. First portion 183 extends radially outward from inner loop 181A and first bolt 159 and longitudinal axis X2 of first bolt 150. First portion 183 is transverse relative to second portion 184 and, more particularly, is perpendicular relative to second portion 184. Second portion 184 is spaced apart from and extends forwardly alongside first bolt 150 from first portion 183 past head 151 of first bolt 150 to third portion 195 ahead of head 151 of first bolt 150. Third portion extends 185 inward from second portion 184 toward longitudinal axis X2 of first bolt 150 to outer loop 182A of outer end 182. Outer loop 182A of outer end 182 resides along axis X2. Inner loop axis P4 is coincident with longitudinal axis X2 of first bolt 150 and outer loop axis P5 is perpendicular relative to inner loop axis P4.

In FIG. 14, connector assembly 140 further includes a first compression spring 190, a second compression 191, and a third compression spring 192. First, second, and third compression springs 190, 191, and 192 are conventional compression/tension springs that each provides an outward bias and is a wire formed into numerous active coils including two, opposed outermost coils. First, second, and third compression springs 190, 191, and 192 are each fashioned of spring steel having the customary constant moduli of elasticity as is typical with compression/tension springs.

First, second, and third compression springs 190, 191, and 192 encircle first bolt 150. First, second, and third compression springs 190, 191, and 192, and inner loop 181A are captured on first bolt 150 between head 151 and first end 145 of frame 144. Second compression spring 191 is tensioned between first compression spring 190 and the third compression spring 192, first compression spring 190 is tensioned between head 151 of first bolt 150 and second compression spring 191, and third compression spring 192 is tensioned between second compression spring 191 and first end 145 of frame 144. Inner loop 181A encircles first bolt 150 between second compression spring 191 and third compression spring 192. The first, second, and third compression springs 190, 191, and 192 are tensioned in series from head 151 of first bolt 150 to first end 145 of frame 144, first compression spring 190 being tensioned against head 151 and second compression spring 191, third compression spring 192 being tensioned against first end 145 of frame 144 inner loop 181A of connector 180, and second compression spring 191 being tensioned against first compression spring 190 and inner loop 181A of connector 180. First and second compression springs 190 and 191 are concurrently constantly tensioned in the direction of inner end 145 of frame 144 against inner loop 181A of connector 180 encircling first bolt 150 between second compression spring 191 and third compression spring 192, and third compression spring 192 is constantly tensioned in the opposite direction toward head 151 against inner loop 181A of connector encircling bolt 150.

As explained above in connection with connector assembly 50, a compression spring is designed with a specific strength, which is dependent on the material, the diameter of the wire and the pitch of the coils. In connector assembly 140, first compression spring 190 has a first strength or working stress, second compression spring 191 has a second strength or working stress, and third compression spring 192 has a third strength or working stress. The second strength or working stress of the second compression spring 192 is less than the first strength or working stress of the first compression spring 190 and is less than the third strength or working stress of the third compression spring 192. The first strength or working stress of the first compression spring 191 is equal to the third strength or working stress of the third compression spring 192. In connector assembly 140, first, second, and third compression springs 190, 191, and 192 are well known average service springs. Depending on the application, compression springs 190, 191, and 192 can be light service compression springs, or severe service compression springs in alternate embodiments.

Connector assembly 140 is useful for adjusting the tension of tensioning systems, lengths of ropes, cables, wires, and the like. Connecting loop 161 of second bolt 160 and outer loop 182A can be connected to such a tensioning system, and the tension can be adjusted by rotating frame 140, which causes first and second bolts 150 and 160 to be simultaneously screwed in or out of first and second ends 145 and 146, respectively, without twisting first and second bolts 150 and 160 or the tensioning system.

The tension supplied by third compression spring 192 on one side of outer loop 182A of connector 180 between first end 145 of frame 144 and inner loop 181A and the tension of first and second compression springs 190 and 191 on the opposed side of inner loop 181A of connector 180 between head 151 and inner loop 181A constantly work against each other urging inner loop 181A of connector 180 to an initial or at-rest position between second and third compression springs 191 and 192 in FIG. 19 along the length of first bolt 150 proximate to first end 145 of frame 144 between head 151 of first bolt 150 and first end 145 of frame 144. Second compression spring 191 is tensioned/compressed comparatively more than first and third compression springs 190 and 192 because the strength of second compression spring 191 is less than the strength of second and third compression springs 191 and 192.

In FIG. 19, as a matter of example a ring 200 is shown connecting outer loop 182A to connecting strap 201. Connecting strap 201 and connecting loop 161 are connectable to a tensioning system. In response to tensioning of connector assembly 140, connecting strap 201 and connecting loop 161 of second bolt 161 are pulled apart by the tensioning system, and connector 80 is concurrently driven in the direction of arrowed line E in FIG. 20 urging inner loop 181A along first bolt 150 in the same direction away from first end 145 of frame 144 and toward head 151 of first bolt concurrently compressing first and second compression springs 190 and 191 between inner loop 181A and head 151 of first bolt 150 while partially relieving the tension of third compression spring 192 between first end 145 of frame 144 and inner loop 181A allowing third compression spring 192 to partially decompress. Because first compression spring 190 acting between head 151 and second compression spring 191 is stronger than second compression spring 191, first and second compression springs 190 and 191 cooperate to increasingly resist movement of connector 180 in the direction of arrowed line E as inner loop 181A moves from its at-rest position in FIG. 19 in the direction of arrowed line E in FIG. 20 toward head 151. In response to release of the tension applied across connector assembly 140 from the tensioning system, the tension applied by first, second, and third compression springs 190, 191, and 192 cooperate to urge inner loop 181A, and thus connector 180, back to the at-rest position until the tension supplied by third compression spring 192 on one side of outer loop 182A of connector 180 between first end 145 of frame 144 and inner loop 181A is equalized with respect to the tension of first and second compression springs 190 and 191 on the opposed side of inner loop 181A of connector 180 between head 151 and inner loop 181A.

In FIG. 19, turnbuckle 141 is adjusted via rotation lengthening the distance between head 151 of first bolt 150 and first end 145 of frame 144, which sets the initial tensions supplied by the respective first, second, and third compression springs 190, 191, and 192. To increase the initial tension supplied by first, second, and third compression springs 190, 191, and 192, turnbuckle 141 can be adjusted via rotation as in FIG. 21 to shorten the distance between head 151 of first bolt 150 and first end 145 of frame 144. To decrease the initial tension supplied by first, second, and third compression springs 190, 191, and 192, turnbuckle 141 can be adjusted from FIG. 19 to further increase the distance between head 151 of first bolt 150 and first end 145 of frame 144.

In FIGS. 19, 20, and 21, inner loop 181A encircles first bolt 150 between second compression spring 191 and third compression spring 192. In FIGS. 22 and 23, connector assembly 140 reconfigured in that inner loop 181A encircles first bolt 150 between second compression spring 191 and first compression spring 190. In FIGS. 22 and 23, the first, second, and third compression springs 190, 191, and 192 are tensioned in series from head 151 of first bolt 150 to first end 145 of frame 144, first compression spring 190 being tensioned against head 151 and inner loop 181A of connector 180, third compression spring 192 being tensioned against first end 145 of frame 144 and second compression spring 191, and second compression spring 191 being tensioned against third compression spring 192 and inner loop 181A of connector 180. First compression spring 190 is concurrently constantly tensioned in the direction of inner end 145 of frame 144 against inner loop 181A of connector 180 encircling first bolt 150 between first compression spring 190 and second compression spring 191, and second and third compression springs 191 and 192 are constantly tensioned in the opposite direction of head 151 against inner loop 181A of connector encircling bolt 150.

In the embodiment of connector assembly 140 in FIGS. 22 and 23, the tension supplied by second and third compression springs 191 and 192 on one side of outer loop 182A of connector 180 between first end 145 of frame 144 and inner loop 181A and the tension of first compression spring 190 on the opposed side of inner loop 181A of connector 180 between head 151 and inner loop 181A constantly work against each other urging inner loop 181A of connector 180 at an initial or at-rest position between first and second compression springs 190 and 191 in FIG. 22 along the length of first bolt 150 proximate to head 151 of first bolt 150 between head 151 of first bolt 150 and first end 145 of frame 144. Second compression spring 191 is compressed comparatively more than first and third compression springs 190 and 192 because the strength of second compression spring 191 is less than the strength of second and third compression springs 191 and 192.

In FIG. 22, ring 200 is shown connecting outer loop 182A to connecting strap 201, and connecting strap 201 and connecting loop 161 are connectable to a tensioning system. In response to tensioning of the tension system in FIG. 20, connecting strap 201 and connecting loop 161 of second bolt 161 are pulled apart, and connector 180 is concurrently driven in the direction of arrowed line E in FIG. 23 urging inner loop 181A along first bolt 150 in the same direction away from first end 145 of frame 144 and toward head 151 of first bolt compressing first compression spring 190 between inner loop 181A and head 151 of bolt 150 while partially relieving the tension of second and third compression springs 191 and 192 between first end 145 of frame 144 and inner loop 181A allowing second and third compression springs 191 and 192 to partially decompress. First compression spring 190 resists movement of connector 180 in the direction of arrowed line E as inner loop 181A moves from its at-rest position in FIG. 22 in the direction of arrowed line E in FIG. 23 toward head 151. In response to release of the tension applied across connector assembly 140 from the tensioning system, the tension applied by first, second, and third compression springs 190, 191, and 192 cooperate to urge inner loop 181A, and thus connector 180, back to the at-rest position until the tension supplied by first compression spring 190 on one side of outer loop 182A of connector 180 between head 151 and inner loop 181A is equalized with respect to the tension of second and third compression springs 190 and 191 on the opposed side of inner loop 181A of connector 180 between inner end 145 of frame 144 and inner loop 181A. In FIGS. 22 and 23, only first compression spring 190 acts between head 151 of first bolt 150 and inner loop 181A of connector 180. This lessens the ability for connector assembly 140 to lengthen between outer loop 182A and connecting loop 161 compared to the ability of connector assembly 140 to lengthen between outer loop 182A and connecting loop 161 with first and second compression springs 190 and 192 acting between head 151 of first bolt 150 and inner loop 181A of connector 180 as can be needed depending on the particular application of connector assembly 140.

Attention is new directed to FIG. 24 illustrating a further embodiment of a connector assembly 250 shown connected to the displaceable members corresponding to FIG. 4, including segment of inner arm 52 pivotally connected to outer arm 54. Inner arm 52 includes an outer end 53. Outer arm 54 includes first part 54A having inner end 57, and second part 54B having intermediate bend 54C. Pivot joint 64 pivotally connects outer end 53 of inner arm 52 to inner end 57 of first part 54A of outer arm 54. First part 54A extends upright from inner end 57 to intermediate bend 54C in outer arm 54. In this example, inner end 57 of outer arm 54 is an eye bar and outer end 53 of inner arm 52 is a clevis. The eye bar of outer end 53 of inner arm 52 is inserted into the clevis of inner end 57 of outer arm 54, which are attached pivotally with nut-and-bolt assembly 58. This characterizes pivot joint 64, which provides pivotal movement of outer arm 54 relative to inner arm 52 from an inner position toward inner arm 52 in FIG. 25 to an outer position away inner arm 52 in FIG. 26 from either side of an initial, starting, or neutral position of outer arm 54 in FIG. 24 between the inner position of outer arm 54 in FIG. 25 and the outer position of outer arm 54 in FIG. 26. Connector assembly 250 is connected to inner arm 52 and the intermediate bend 54C of outer arm 54. Connector assembly 250 extends across the inner angle between inner arm 52 and first part 54A to the intermediate bend 54C of outer arm 54. Connector assembly 250 is mounted rigidly and immovably to inner arm 52 and is mounted pivotally to intermediate bend 54C in outer arm 54. Connector assembly 250 acts as a shock absorber between inner arm 52 and outer arm 54, displacing between shortened and lengthened conditions in response to pivotal movement of outer arm 54 relative to inner arm 52 between its inner position and its outer position. Connector assembly 250 is set to an initial or starting sag corresponding to the initial, neutral, or starting position of outer arm 54 relative to inner arm 52 in FIG. 24, is set to or otherwise assumes an inner loaded sag corresponding to the inner position of outer arm 54 relative to inner arm 52 in FIG. 25, and is set to or otherwise assumes a outer loaded sag corresponding to the outer position of outer arm 54 relative to inner arm 52 in FIG. 26. Again, the term "sag" is a common term in the field of shock absorbers and means the amount of sag or deflection of the shock absorber, here being connector assembly 250. FIG. 24 is a fragmentary perspective view of the displaceable members corresponding to FIG. 4 showing connector assembly 250 set to its initial sag corresponding to the initial, starting, or neutral position of outer arm 54 relative to inner arm 52 under a normal load condition, FIG. 25 is a fragmentary perspective view of the displaceable members corresponding to FIG. 5 showing connector assembly set 250 to its inner loaded sag corresponding to the inner or inner loaded position of outer arm 54 relative to inner arm 52 under an inner loaded condition, and FIG. 26 is a fragmentary perspective view of the displaceable members corresponding to FIG. 6 showing connector assembly 250 set to its outer loaded sag corresponding to the outer or outer loaded position of outer arm 54 relative to inner arm 52 under an outer loaded condition.

Figure 27:
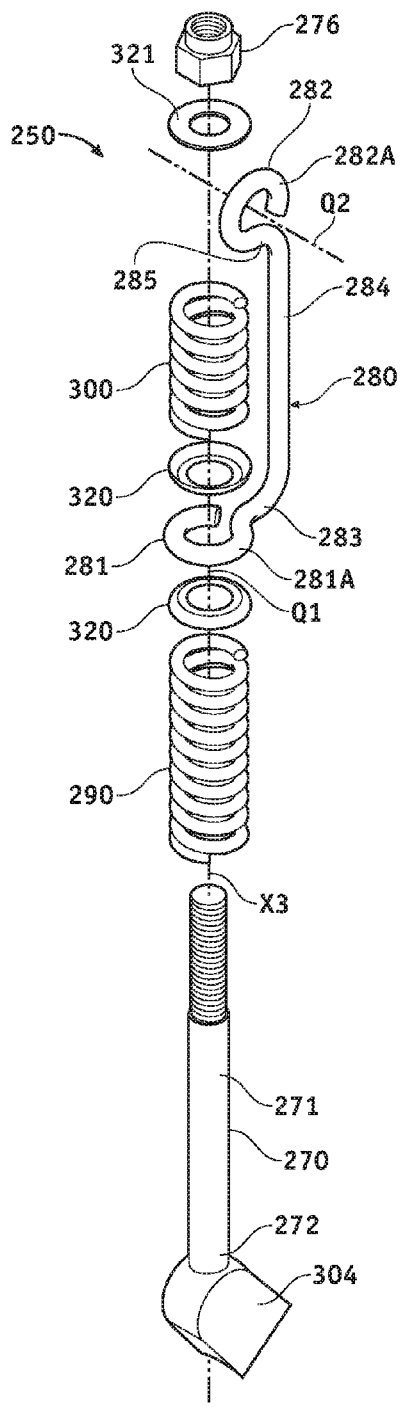
FIG. 27 is an exploded perspective view of the connector assembly of FIG. 24.

Turning to FIG. 27, connector assembly 250 includes bolt 270. Bolt 270 is a shank 271 that includes inner extremity 272, and outer extremity 273. Inner extremity 272 is mountable rigidly and is formed with lug 304, which is mounted rigidly and immovably to inner arm 52. Outer extremity 273 is threaded. Nut 276 is threaded onto outer extremity 273. Nut 276 is considered a part of shank 271 when threaded on outer extremity 273. Lug 304 is an inner abutment of shank 271 proximate to inner extremity 272, and nut 276 is an outer abutment applied to shank 271 proximate to outer extremity 273. Accordingly, reference numeral 304 is used to denote both the lug and the inner abutment of shank 271, and reference numeral 276 is used to denote both the bolt and the outer abutment of shank 271. Shank 271 is elongate and straight and is arranged about a longitudinal axis X3 in FIG. 27 that extends from inner extremity 272 to outer extremity 273. In an alternate embodiment, outer abutment 276 can be fixed in place, such as by welding. Longitudinal axis X3 is a fixed axis because lug 304 of inner extremity 272 of bolt 270 is mounted rigidly and immovably to inner arm 52.

Connector assembly 250 further includes a connector 280. Connector 280 is an elongate member formed of spring wire that is bent to shape, and that has shape memory. Referring to FIGS. 27-31 in relevant part, connector 280 includes an inner end 281, an outer end 282, and a first portion 283, a second portion 284, and a third portion 284 between inner end 281 and outer end 282. First, second, and third portions 283, 284, and 285 of connector 280 are each elongate, each having a length. The length of second portion 284 of connector 250 is longer than the length of first portion 283 and also the length of third portion 285. First and third portions 285 are approximately equal in length. Inner end 281 is an inner loop 281A. Inner loop 281A is not completely closed, but can be completely closed in an alternate embodiment if so desired by rigidly affixing, such as by welding or heat bonding, the tag end of inner loop 281A to the opposed standing part of inner end 281.

Figure 28:
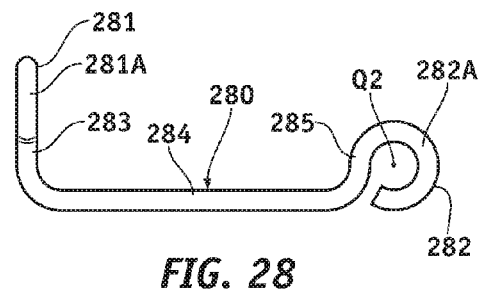
FIG. 28 is a left side elevation view of a connector of the connector assembly of FIG. 24.
Figure 29:
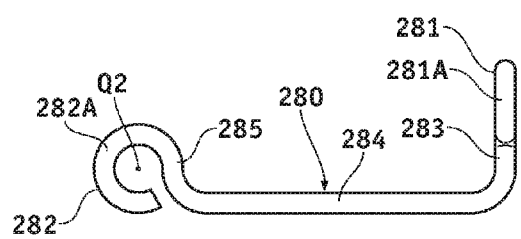
FIG. 29 is a right side elevation view of the embodiment of FIG. 28.
Figures 30, 31:
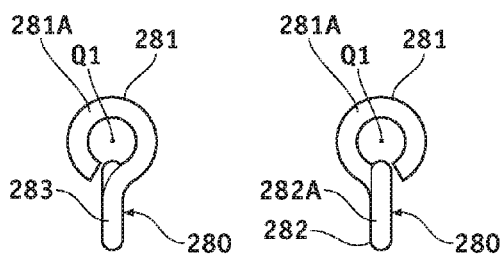
FIG. 30 is a rear elevation view of the embodiment of FIG. 28.
FIG. 31 is a front elevation view of the embodiment of FIG. 24.

First, second, and third portions 283, 284, and 285 reside in a common plane. First and third portions 283 and 285 extend outwardly in same direction from bends at either end of second portion 284. First portion 283 is perpendicular relative to second portion 284, and third portion 285 extends forwardly from second portion and is aslant/oblique relative to second portion 284 at an angle of from 40 degrees to 50 degrees in this example. Outer end 282 is pivotally mountable, and is a pivotally mountable outer loop 282A. In FIGS. 27, 30 and 31, inner loop 281A encircles an inner loop axis Q1. In FIGS. 27-29, outer loop 282A encircles outer loop axis Q2. Inner loop axis Q1, along which inner loop 281A reciprocates, is perpendicular relative to the outer loop axis Q2. Outer loop 282A pivots about outer loop axis Q2.

In FIGS. 24, 24A, and 25-26, inner end 281 of connector 280 is mounted reciprocally to shank 271 between inner abutment 304 and outer abutment 276 for movement in reciprocal directions relative to inner abutment 304 and outer abutment 276 indicated by double arrowed line F in FIG. 24. Specifically, inner loop encircles shank 271 proximate to outer extremity 273 between lug 304 defining the inner abutment of shank 271, and nut 276 defining the outer abutment of shank 271. First portion 283 extends from inner loop 281A to second portion 284. First portion 283 extends radially inward from shank 271 toward inner arm 52 and from longitudinal axis X1 of shank 271 to second portion 284, and second portion 284 is, as indicated above, perpendicular relative to first portion 283. Second portion 284 is spaced from, and extends along the side of shank 271, and extends forwardly from first portion 283 past outer extremity 273 and outer abutment 276 to third portion 285 ahead of outer extremity 273 and outer abutment 276. Third portion 285 extends outwardly from second portion 284 toward longitudinal axis X3 of shank 271 and forwardly from second portion 284 to outer loop 282A of outer end 282 (FIGS. 24A and 27), the third portion being aslant/oblique relative to second portion 284 and also relative to shank 271 including longitudinal axis X3 of shank 271.

Sufficient clearance between inner loop 281A and shank 271 permits inner loop 281A to displace pivotally on shank 271 relative to longitudinal axis X3, and to move in reciprocal directions along shank 271 along longitudinal axis X3 as indicated by double arrowed line F in FIG. 24 relative to inner abutment 304 and outer abutment 276 between an inner position in FIG. 25 corresponding to the inner loaded sag of connector assembly 250 and an inner or retracted position of connector 280 relative to shank 271, an outer position in FIG. 26 corresponding to the outer loaded sag of connector assembly 250 and an outer or extended position of connector 280 relative to shank 271, and an intermediate position in FIG. 24 between the inner position of inner loop 281A in FIG. 25 and the outer position of loop 281A in FIG. 26 corresponding to the initial sag of connector assembly 250 and an initial, starting, or neutral position of connector 280 relative to shank 270.

In FIGS. 24-27, connector assembly 250 further includes a first compression spring 290 and a second compression spring 300. First and second compression springs 290 and 300 are conventional compression/tension springs that each provides an outward bias. Each of the first and second compression springs 290 is a wire formed into numerous active coils. Each of the first and second compression springs 290 and 300 is a wire formed into numerous active coils. First and second compression springs 290 and 300 are each fashioned of spring steel having the customary constant moduli of elasticity as is typical with compression/tension springs. First and second compression springs 290 and 300 are installed on shank 270 between inner abutment 304 and outer abutment 276. First and second compression springs 290 and 300 and inner loop 281A are installed onto shank 271 over outer extremity 273 and then nut 276 is threaded onto outer extremity 273 of shank 271. Specifically, first and second compression springs 290 and 300 encircle shank 271 between inner abutment 304 and outer abutment 276. First and second compression springs 290 and 300 and inner loop 281A are captured on shank 271 between inner abutment 304 and outer abutment 276. Inner loop 281A encircles shank 271 between first compression spring 290 and second compression spring 300. One washer 320 encircles shank 271 between first compression spring 290 and inner loop 281A, and another washer encircles shank 271 between second compression spring 300 and inner loop 281A. A washer 321 encircles shank 271 between second compression spring 300 and outer abutment 276. First compression spring is tensioned against inner abutment 304 and inner loop 281A, and second compression spring 300 is tensioned against inner loop 281A and outer abutment 276. A washer 321 encircles shank 271 between second compression spring 300 and outer abutment 276. First and second compression springs 290 and 300 keep tension on either side of the inner loop 281A urging it into its intermediate position in FIG. 24 between the inner position of inner loop 281A in FIG. 25 and the outer position of loop 281A in FIG. 26 corresponding to the initial sag of connector assembly 250 and an initial, starting, or neutral position of connector 280 relative to shank 270.

A compression spring is designed with a specific strength or working stress, which is dependent on the material, the diameter of the wire and the pitch of the coils. In connector assembly 250, each of first and second compression springs 290 and 300 has strength or working stress. The strength or working stress of first and second compression springs 290 and 300 is the same in this example, and can be different in alternate embodiments. Compression springs 290 and 300 are well known "average service" springs. Average service springs make up the majority of springs in general use such as those found in motors, brakes, switches, machines, and mechanical products. Depending on the application, compression springs 290 and 300 can be "light service" compression springs, or "severe service" compression springs in alternate embodiments. Light service compression springs are well known to the skilled artisan and have small deflections with low stress ranges. Severe service compressions springs are also well known to the skilled artisan and are subjected to rapid deflections over long periods of time.

Connector assembly 250 is useful for resiliently and dynamically connecting displaceable members, such as pivotally connected inner and outer arms 52 and 54 in FIGS. 24-26. As stated above, connector assembly 250 is connected to inner arm 52 and the intermediate bend 54C of outer arm 54, and extends across the inner angle between inner arm 52 and first part 54A to the intermediate bend 54C of outer arm 54. Inner extremity of shank 271 is mounted rigidly and immovably to inner arm 52 with lug 304, and outer end 282 of connector 280 is mounted pivotally to the intermediate bend 54C of outer arm 54 between first part 54A and second part 54B. In this example, lug 304 is affixed rigidly and immovably to inner arm 52 via welding. A clevis 310 is rigidly affixed to intermediate bend 54C of outer arm 54 via welding, and outer loop 282A of outer end 282 of connector 280 is pivotally connected to clevis 310 with nut-and-bolt assembly 310. Outer loop 282A pivots at nut-and-bolt assembly 311 about a pivot axis, which is outer loop axis Q2. Washers 312 encircle the bolt of nut-and-bolt assembly 311 between clevis 310 on either side of outer loop 282A.

Connector assembly 250 holds inner and outer arms 52 and 54 in operative positions and restrains movement of outer arm 54 relative to inner arm 52 from its inner position in FIG. 25 and its outer position in FIG. 26 on either side of its neutral position in FIG. 24. Connector assembly 250 acts as a shock absorber between inner arm 52 and outer arm 54. The tension supplied by first and second tension springs 290 and 300 on either side of inner loop 281A constantly urges inner loop 281A toward its intermediate or neutral position in FIG. 24.

In FIG. 24, connector assembly 250 is set to the initial or starting sag corresponding to the initial or neutral or starting position of outer arm 54 relative to inner arm 52 in FIGS. 1 and 4 in a normal load condition. In this starting position of outer arm 54 relative to inner arm 52, inner loop 281A is set to its intermediate position between the inner position of inner loop 281A in FIG. 25 and the outer position of loop 281A in FIG. 26 corresponding to the initial position of connector 280, and first and second compression springs 290 and 300 are tensioned to the initial sag of connector assembly 250, in which first and second compression springs 290 and 300 are tensioned on either side of inner loop 281A holding inner loop 281A, and thus connector 280, in its intermediate position.

In response to movement of outer arm 54 from its starting position in FIG. 24 to its inner position in FIG. 25, such as in response to a load applied across inner and outer arms 52 and 54, outer end 282 of connector 280 pivots at outer loop 282A about outer loop axis Q2, and connector 280 is driven in the direction of arrowed line G in FIG. 25 from its initial position in FIG. 24 to its retracted position in FIG. 25 concurrently urging inner loop 281A along shank 271 in the same direction away from outer abutment 276 and toward inner abutment 304 from its initial position in FIG. 24 to its inner loaded position in FIG. 25 concurrently compressing first compression spring 290 between inner abutment 304 and inner loop 281A and relaxing second compression spring 300 between outer abutment 276 and inner loop 281A. First compression spring 290 resists movement of outer arm 54 as first compression spring 290 is compressed between inner abutment 304 and inner loop 281A as outer arm 54 moves from its starting position in FIG. 24 to its inner position in FIG. 25.

In response to movement of outer arm 54 from its starting position in FIG. 24 or its inner position in FIG. 25 to its outer position in FIG. 26, outer end 282 of connector 280 pivots at outer loop 282A about outer loop axis Q2, and connector 280 is driven in the direction of arrowed line H in FIG. 26 from its initial position in FIG. 24 to its extended position in FIG. 26 concurrently urging inner loop 281A along shank 271 in the same direction away from inner abutment 304 and toward outer abutment 276 concurrently relaxing first compression spring 290 between inner abutment 304 and inner loop 281A and compressing second compression spring 300 between outer abutment 276 and inner loop 281A. Second compression spring 300 resists movement of outer arm 54 as first compression spring 290 is compressed between outer abutment 276 and inner loop 281A as outer arm 54 moves from its starting position in FIG. 24 to its outer position in FIG. 26. In response to movement of connector 280 from its starting position to its inner position and from its starting position to its outer position, inner loop 281A freely pivots on shank 271 relative to longitudinal axis X3 and moves along shank 271 in reciprocal directions relative to inner abutment 304 and outer abutment 276. Connector assembly 250 provides shock absorption between inner and outer arms 52 and 54, and tends to keep outer arm 54 in its neutral position in FIG. 24 between the inner position of outer arm 54 in FIG. 25 and the outer position of outer arm 54 in FIG. 26.

As nut 276 is threaded on outer extremity 273 of shank 271 of bolt 270, nut 276 forming the outer abutment is adjustable in reciprocal directions along shank 271 in response to rotation of nut 276 relative to shank 271. This adjustability of nut 276 allows the initial tension of first and second compression springs 290 and 300 to be adjusted as needed.

In FIGS. 24-26, inner loop 281A encircles shank 271, first portion 283 extends from inner loop 281A to second portion 284, first portion 283 extends radially inward from shank 271 and from longitudinal axis X3 of shank 271 toward inner arm 52 and the inner angle between inner and outer arms 52 and 54 to second portion 284, second portion 284 is perpendicular relative to first portion 283, second portion 284 is spaced from and extends along the side of shank 271 and extends forwardly from first portion 283 past outer extremity 273 and outer abutment 276 to third portion 285 ahead of outer extremity 273 and outer abutment 276, and third portion 285 extends outwardly from second portion 284 toward longitudinal axis X3 of shank 271 and forwardly from second portion 284 to outer loop 282A of outer end 282 (see FIG. 27) pivotally connected to outer arm 54, the third portion 285 being aslant/oblique relative to second portion 284 and shank 271 including longitudinal axis X1 of shank 271, outer loop 282A of outer end 282 located ahead of an opposing outer extremity 74 and outer abutment 276. The shape of connector 280 is chosen to produce a mechanical advantage to compress and decompress springs 290 and 300 with the movement of connector 280 between its inner and outer positions in response to pivotal movement of outer arm 54 between its inner and outer positions. The orientation of third portion 285 being aslant/oblique from second portion 284 to the pivotal connection of outer loop 282A indicated by outer loop axis Q2 relative to second portion 284 and shank 271 including longitudinal axis X3 of shank 271 imparts strength in connector 280 and produces the mechanical advantage of connector 280.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A connector assembly, comprising:
   a turnbuckle, the turnbuckle including a frame having a first end and a second end, a first bolt screwed into the first end of the frame, and a second bolt screwed into the second end of the frame, wherein the first bolt is arranged about a longitudinal axis and extends outwardly from the first end of the frame to a head, and the second bolt is an eye bolt that extends outwardly from the second end of the frame to a connecting loop;
   a connector including a wire member having an inner end, an outer end, and a first portion, a second portion, and a third portion between the inner end and the outer end, wherein the inner end is an inner loop, the inner loop encircles the first bolt between the first end of the frame and the head, the inner loop is movable reciprocally along the first bolt relative to the first end of the frame and the head, the first portion extends from the inner loop to the second portion, the first portion extends outward from the longitudinal axis of the first bolt and is transverse relative to the second portion, the second portion extends from the first portion past the head of the first bolt to the third portion ahead of the head of the first bolt, the third portion extends inward from the second portion toward the longitudinal axis of the first bolt to the outer end of the connector, the second portion of the connector is longer than each of the first portion and the third portion of the connector, and the outer end of the connector is an outer loop adapted to be connected to a connecting strap; and
   first, second, and third compression springs encircling the first bolt, wherein the first, second, and third compression springs and the inner loop are captured on the first bolt between the head and the first end of the frame, the second compression spring is tensioned between the first compression spring and the third compression spring, the first compression spring is tensioned between the head and the second compression spring, the third compression spring is tensioned between the second compression spring and the first end of the frame, the inner loop encircles the first bolt between the second compression spring and one of the first compression spring and the third compression spring, the first, second, and third compression springs are tensioned in series from the head of the first bolt to the first end of the frame, the first compression spring is tensioned against the head, the third compression spring is tensioned against the first end of the frame, the second compression spring and the one of the first compression spring and the third compression spring are tensioned against the inner loop, and the second compression spring and the other one of the first compression spring and the third compression spring are tensioned against one another, the first compression spring has a first strength, the second compression spring has a second strength, and the third compression spring has a third strength, the second strength of the second compression spring is less than each of the first strength of the first compression spring and the third strength of the third compression spring.

2. The connector assembly according to claim 1, wherein the first portion of the connector is perpendicular relative to the second portion of the connector and the longitudinal axis of the first bolt.

3. The connector assembly according to claim 1, wherein the third portion of the connector is perpendicular relative to the second portion of the connector and the longitudinal axis of the first bolt.

* * * * *